(12) United States Patent
Lewis

(10) Patent No.: US 7,584,602 B2
(45) Date of Patent: Sep. 8, 2009

(54) AUGMENTOR FLOW CONTROL WITH THERMAL RECIRCULATION FUNCTION USING AUGMENTOR VALVES

(75) Inventor: Steven A. Lewis, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 650 days.

(21) Appl. No.: 11/406,322

(22) Filed: Apr. 19, 2006

(65) Prior Publication Data

US 2007/0051089 A1 Mar. 8, 2007

Related U.S. Application Data

(60) Provisional application No. 60/673,369, filed on Apr. 21, 2005.

(51) Int. Cl.
*F02C 9/26* (2006.01)
*F02K 3/10* (2006.01)

(52) U.S. Cl. .................................. 60/243; 60/764

(58) Field of Classification Search .............. 60/39.281, 60/243, 761, 764
See application file for complete search history.

(56) References Cited

U.S. PATENT DOCUMENTS

| | | | |
|---|---|---|---|
| 2,700,275 A | * | 1/1955 | Chandler et al. .......... 60/39.281 |
| 3,591,968 A | * | 7/1971 | Arnett .......................... 60/243 |
| 3,738,107 A | | 6/1973 | Miller |
| 3,779,007 A | | 12/1973 | Lavash |
| 3,834,160 A | | 9/1974 | Moehring et al. |
| 4,134,259 A | | 1/1979 | Gardner et al. |
| 6,487,847 B1 | | 12/2002 | Snow et al. |
| 6,584,762 B2 | | 7/2003 | Snow et al. |
| 6,820,411 B2 | | 11/2004 | Pederson et al. |
| 6,895,756 B2 | | 5/2005 | Schmotolocha et al. |
| 6,907,724 B2 | | 6/2005 | Edelman et al. |
| 2003/0074884 A1 | | 4/2003 | Snow et al. |
| 2005/0050897 A1 | | 3/2005 | Lewis |

\* cited by examiner

*Primary Examiner*—Louis J Casaregola
(74) *Attorney, Agent, or Firm*—Ingrassia Fisher & Lorenz, P.C.

(57) ABSTRACT

A fuel system for a gas turbine engine having at least one augmentor zone which fuel system includes a fuel pump (12) drawing fuel from a fuel tank (10) and pumping the fuel in a downstream direction, at least one fuel line (14) connecting the fuel pump (12) to the at least one augmentor zone, at least one augmentor metering valve (20) in the at least one augmentor fuel line (14) for metering fuel to the at least one augmentor zone, and a fuel return path (32) returning fuel from a point in the fuel line (14) downstream of the fuel pump (12) to the fuel tank (10), wherein the point is downstream of the at least one augmentor metering valve (20). A selector valve (30) is provided to allow thermal recirculation of fuel using an augmentor metering valve. Also a method of controlling fuel recirculation in a gas turbine engine.

10 Claims, 2 Drawing Sheets

AUGMENTOR FLOW CONTROL WITH THERMAL RECIRCULATION FUNCTION USING AUGMENTOR VALVES

CROSS-REFERENCE TO RELATED APPLICATIONS

The present application claims the benefit of U.S. Provisional Application No. 60/673,369, filed Apr. 21, 2005, the entire contents of which is hereby incorporated by reference.

STATEMENT REGARDING GOVERNMENT SUPPORT

This invention was made with Government support under Contract No. N00019-02-C-3003 awarded by the United States Navy. The Government has certain rights in this invention.

FIELD OF THE INVENTION

The present invention is directed to a fuel control system for an aircraft having one or more augmentor zones and a fuel return system that selectively diverts a portion of recirculating fuel to a fuel tank, and, more specifically, to a fuel control system for an aircraft having one or more augmentor zones and a fuel return system in which an augmentor fuel control valve is used to selectively divert fuel from a fuel recirculation system to a fuel tank.

BACKGROUND OF THE INVENTION

Gas turbine engines, such as those found on jet aircraft, comprise a housing within which fuel and air are combined and burned. The resulting hot exhaust gasses are used to turn a turbine and provide thrust when they exit the housing. Such engines generally include a fan to draw air into the housing and a compressor that compresses the air and sends it to a gas generator. Here a precisely metered supply of fuel is mixed with the compressed air and burned. The expanding exhaust gasses turn a turbine which powers at least the compressor and the fan. The exhaust gasses then pass through the remainder of the housing and exit the housing to provide thrust.

Such engines sometimes include sections called "afterburners" or "thrust augmentors" or merely "augmentors" that allow a gas turbine engine to produce additional thrust for limited periods of time—to help an aircraft take off, or during critical military maneuvers, for example. Augmentors may comprise one or more sets of fuel nozzles located in a chamber downstream from the gas generator in which chamber additional fuel is burned to increase engine thrust.

Fuel is often drawn from aircraft fuel tanks by pumps driven by the aircraft engines. Therefore, the amount of fuel pumped is proportional to the speed of the engines and not necessarily equal the amount of fuel required. Because of this difference, it is generally necessary to provide a fuel bypass recirculation system that comprises a pathway around which fuel is recirculated until it is needed. Pumping fuel through a bypass recirculation pathway, however, heats the fuel, and overheated fuel can cause problems. For example, overheated fuel is less able to perform a cooling function and may cause coking at the fuel nozzles. One way of cooling the fuel in the recirculation pathway is to return some portion of the pumped fuel to the aircraft fuel tank where it mixes with relatively cooler fuel. Cooler fuel is drawn from the fuel tank, and this process maintains the temperature of the fuel system at a reasonable temperature.

FIG. 2 illustrates a portion of a conventional aircraft fuel system including a fuel tank 200, a fuel pump 202 drawing fuel from fuel tank 200, and a fuel line 204 providing fuel to a first zone of augmentor nozzles 206, referred to herein as augmentor lightoff nozzles 206 and augmentor second zone nozzles 208. Fuel to the lightoff nozzles 206 is metered by an augmentor lightoff metering valve 210 and passes through a shutoff valve 212 between lightoff metering valve 210 and the lightoff nozzles 206. Fuel to the augmentor second zone nozzles 208 is metered by augmentor second zone metering valve 214, and passes through a shutoff valve 216 between the second zone metering valve 214 and the second zone nozzles 208.

The fuel system further includes a bypass system 220 through which a portion of the fuel is recirculated inversely proportional to the burn flow demands of the gas generator nozzles and the augmentor nozzles 206 and 208. Fuel in this pathway tends to heat up, and therefore a thermal recirculation flow metering valve 222 is provided for selectively returning a portion of the recirculating fuel to fuel tank 200 directly or, optionally, via a shutoff valve 224. This fuel mixes with relatively cool fuel in the fuel tank and results in a larger quantity of fuel being drawn from the fuel tank 200 by fuel pump 202 into the fuel system reducing the fuel system temperature. The operation of augmentor lightoff metering valve 210, augmentor second zone metering valve 214 and the thermal recirculation flow metering valve 222 is controlled by engine electronic controller 226.

The thermal recirculation flow metering valve and shutoff valve increase the weight and cost of a fuel system. It is generally desirable to lower the weight and/or cost of aircraft fuel systems.

SUMMARY OF THE INVENTION

These problems and others are addressed by embodiments of the present invention, a first feature of which is a fuel system for a gas turbine engine having at least one augmentor zone. The fuel system includes a fuel pump drawing fuel from a fuel tank and pumping the fuel in a downstream direction, and a fuel line connecting the fuel pump to the at least one augmentor zone. An augmentor metering valve is provided in the augmentor fuel line for metering fuel to the at least one augmentor zone, and a fuel return path is provided for returning fuel from a point in the fuel line downstream of the fuel pump to the fuel tank, the point being downstream of the augmentor metering valve.

Another aspect of the invention comprises a method of controlling fuel recirculation in a gas turbine engine fuel system that includes a fuel pump pumping fuel from a fuel tank and a first augmentor fuel line connecting the fuel pump to an augmentor zone, the fuel line including an augmentor metering valve. The method involves pumping fuel through the fuel system, recirculating fuel downstream of the fuel pump, and selectively returning fuel from downstream of the fuel pump to the fuel tank. The return of fuel to the fuel tank is accomplished by providing a selector valve in the augmentor fuel line between the augmentor metering valve and the augmentor zone that is shiftable between a first position directing fuel toward the augmentor zone and a second position directing fuel toward the fuel tank. The selector valve is shifted to the second position and the augmentor metering valve is opened to return fuel to the fuel tank.

A further aspect of the invention comprises a fuel system for a gas turbine engine that includes a fuel pump drawing fuel from a fuel tank and a fuel recirculation path downstream of the fuel pump. A first augmentor fuel line has a first augmentor metering valve and connects the fuel pump to a first augmentor zone. An engine controller controls the first augmentor metering valve, and a fuel return path to the fuel tank is provided that is selectively placeable into fluid communication with the fuel recirculation path, the fuel return path including the augmentor metering valve.

BRIEF DESCRIPTION OF THE DRAWINGS

These aspects of the invention and others will be better understood after a reading of the following detailed description together with the accompanying drawings wherein.

DETAILED DESCRIPTION

Figure 1:
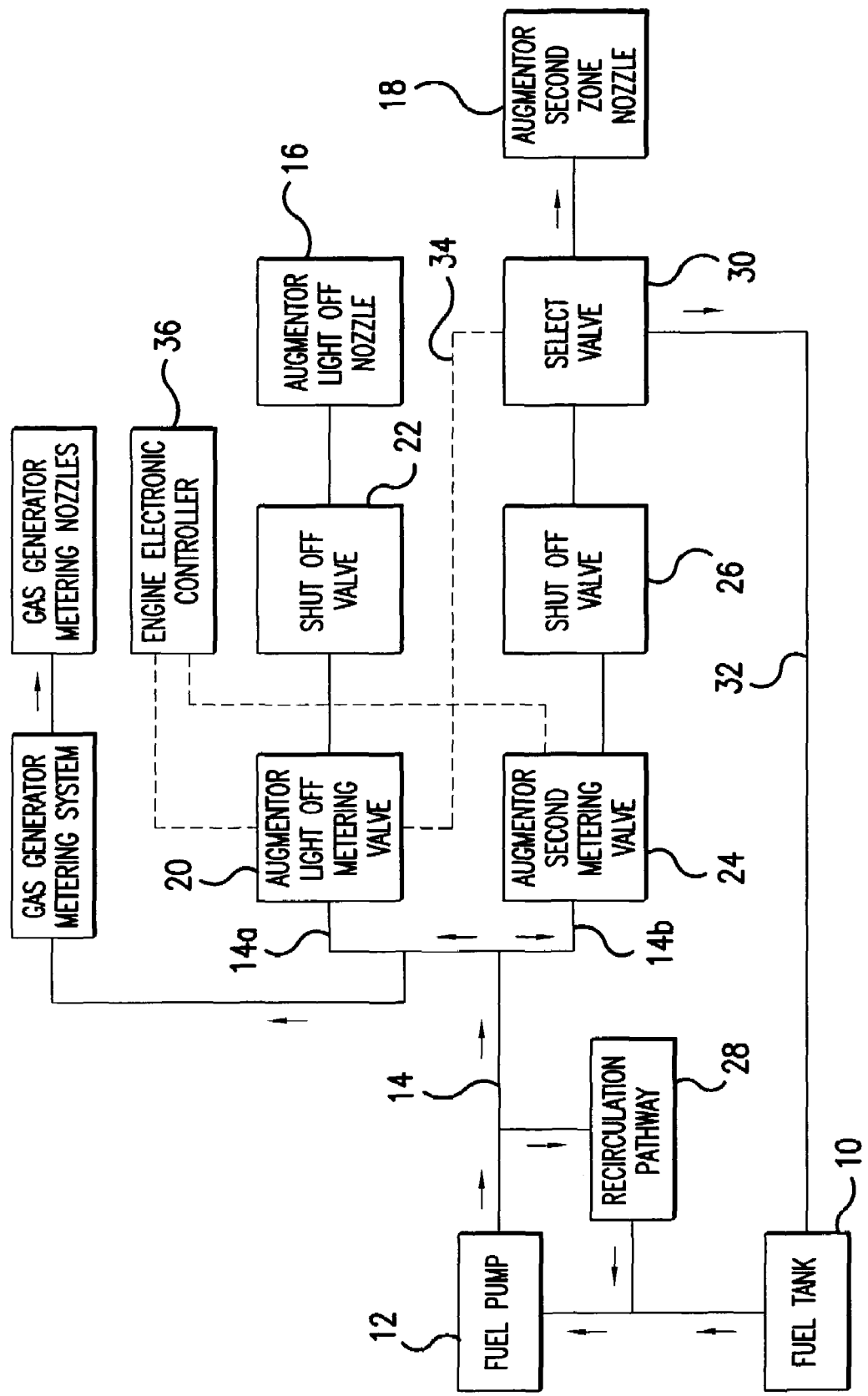
FIG. 1 diagrammatically illustrates a portion of a fuel control system according to an embodiment of the present invention in which an augmentor fuel metering valve is used to control the flow of fuel from a fuel recirculation pathway to a fuel tank.
Figure 2:
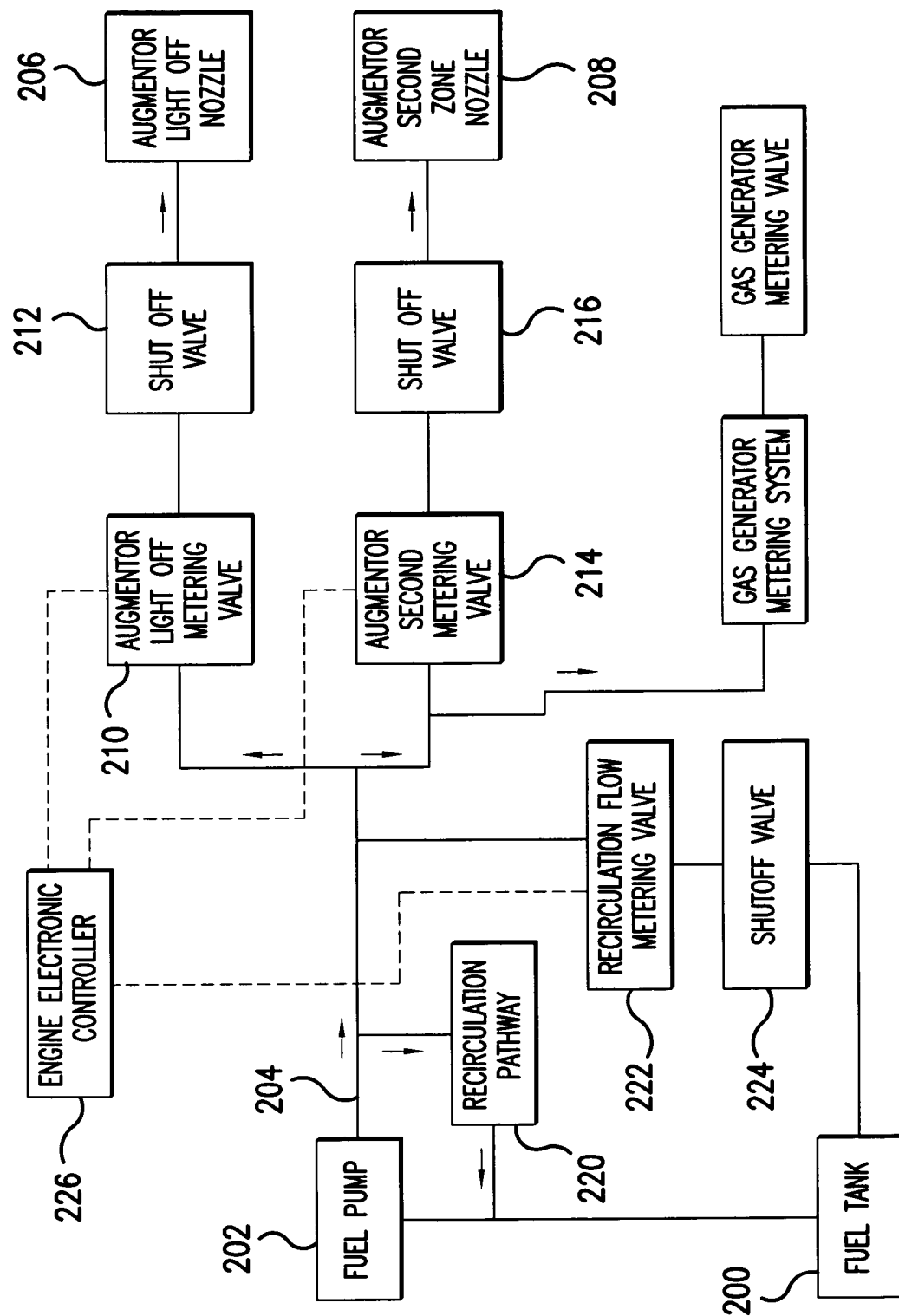
FIG. 2 diagrammatically illustrates a portion of a conventional fuel control system for an aircraft engine having augmentors and a fuel recirculation system.

Referring now to the drawings, wherein the showings are for purposes of illustrating a preferred embodiment of the invention only and not for the purpose of limiting same, FIG. 1 illustrates an aircraft fuel system according to an embodiment of the present invention including a fuel tank 10, a fuel pump 12 drawing fuel from fuel tank 10, and a fuel line 14 having a first branch 14a and a second branch 14b. The first branch 14a provides fuel to augmentor lightoff nozzles 16 and is metered by an augmentor lightoff metering valve 20 before passing through a shutoff valve 22 between lightoff metering valve 20 and the lightoff nozzles 16. Fuel to the augmentor second zone nozzles 18 is provided though fuel line 14b and is metered by augmentor second zone metering valve 24 and passes through a shutoff valve 26 between the second zone metering valve 24 and the second zone nozzles 18. A two-position selector valve 30 is provided between second zone shutoff valve 26 and the second zone nozzles 18. When augmentor second zone nozzles 18 are in use, all or substantially all fuel passing through selector valve 30 will be directed to the augmentor second zone nozzles 18.

The fuel system further includes a bypass system 28 through which the excess fuel pumped that is not required by the augmentor nozzles 16 and 18 or gas generator nozzles is recirculated to the pump inlet. However, fuel in pathway 28 tends to heat up, especially when recirculated more than once, and therefore it is known to divert some of this recirculating fuel to the aircraft's fuel tank 10 where it mixes with cooler fuel. In this embodiment, augmentor second metering valve 24 regulates the thermal recirculation of the fuel from the fuel system to the fuel tank 10. When the augmentors are not in use, selector valve 30 is positioned to direct all or substantially all fuel to fuel line 32 leading to fuel tank 10. The position of augmentor second metering valve 24 determines whether any fuel reaches selector valve 30.

When augmentation is required, augmentation lightoff nozzles 16 are ignited first; if additional augmentation is needed, second augmentor zone nozzles 18 (and third or additional augmentor zone nozzles) (not shown) are ignited. Augmentor lightoff metering valve 20 and augmentor second metering valve 24 are controlled by engine electronic controller 36. In a presently preferred embodiment, the position of selector valve 30 is controlled via line 34 by the augmentor lightoff metering valve 20. Of course, the position of selector valve 30 could just as easily be controlled directly by engine electronic controller 36. When augmentor lightoff metering valve 20 is opened, selector valve 30 is shifted to a position directing fuel to augmentor second zone nozzles 18 (whether or not augmentor second zone metering valve 24 is supplying fuel to augmentor second zone nozzles 18 at that time). During augmentation, a large volume of fuel is drawn from the fuel system, and this reduces the amount of heating experienced by the fuel. Thus, cooling is not needed whenever at least augmentor lightoff metering valve 20 is in use, and selector valve 30 is therefore not needed for returning fuel to fuel tank 10. If augmentor second zone metering valve 24 also begins supplying fuel to augmentor second zone nozzles 18, selector valve 30 will already be in proper position for directing fuel to second zone nozzles 18.

This arrangement thus allows augmentor second metering valve 24 to control the flow of fuel from a thermal recirculation pathway to a fuel tank when augmentation is not required, and to perform normal augmentation fuel control functions when augmentation is required thereby substantially eliminating the need for separate thermal recirculation control metering and shutoff valves and reducing the cost and weight of the fuel control system.

The present invention has been described in terms of a preferred embodiment. However, various modifications and additions to this embodiment will become apparent to those of ordinary skill in the relevant arts upon a reading of the foregoing description. It is intended that all such obvious modifications and additions form a part of the present invention to the extent they fall within the scope of the several claims appended hereto.

I claim:

1. A fuel system for a gas turbine engine having at least one augmentor zone comprising:
    a fuel pump drawing fuel from a fuel tank and pumping the fuel in a downstream direction;
    at least one fuel line connecting said fuel pump to said at least one augmentor zone;
    at least one augmentor metering valve in said at least one fuel line for metering fuel to said at least one augmentor zone; and
    a fuel return path returning fuel from a point in the fuel line downstream of the fuel pump to the fuel tank;
    wherein:
        said point is downstream of said at least one augmentor metering valve, and
        said at least one fuel line includes a selector valve at said point, said selector valve being shiftable from a first position directing fuel to said at least one augmentor zone and a second position directing fuel to said fuel return path.

2. The fuel system of claim 1 including an engine controller controlling said at least one augmentor metering valve and said selector valve.

3. The fuel system of claim 1 wherein said at least one fuel line comprises first and second augmentor fuel lines, said at least one augmentor zone comprises first and second augmentor zones and said at least one augmentor metering valve comprises first and second augmentor metering valves, wherein said point is located in said first augmentor fuel line.

4. The fuel system of claim 2 wherein said at least one fuel line comprises first and second augmentor fuel lines, said at least one augmentor zone comprises first and second augmentor zones and said at least one augmentor metering valve comprises first and second augmentor metering valves,
    wherein said engine controller shifts said selector valve to said first position when said first augmentor metering valve provides fuel to said first augmentor zone.

5. The fuel system of claim 1 including a fuel recirculation path selectably placeable into fluid communication with said fluid return path.

6. A fuel system for a gas turbine engine comprising:
   a fuel pump drawing fuel from a fuel tank;
   a first augmentor fuel line connecting said fuel pump to a first augmentor zone and including a first augmentor metering valve;
   an engine controller controlling said first augmentor metering valve;
   a fuel recirculation path downstream of said fuel pump;
   a fuel return path to said fuel tank selectively placeable into fluid communication with said fuel recirculation path, said fuel return path including said augmentor metering valve; and
   a selector valve in said fuel return path between said augmentor metering valve and said augmentor zone.

7. The fuel system of claim 6 including a second augmentor fuel line connecting said fuel pump to a second augmentor zone and including a second augmentor metering valve, the engine controller controlling the second augmentor metering valve.

8. The fuel system of claim 6 wherein the position of the selector valve is based on a position of the second augmentor metering valve.

9. A fuel system for a gas turbine engine having at least one augmentor zone comprising:
   a fuel pump drawing fuel from a fuel tank and pumping the fuel in a downstream direction;
   at least one fuel line connecting said fuel pump to said at least one augmentor zone;
   at least one augmentor metering valve in said at least one fuel line for metering fuel to said at least one augmentor zone; and
   a fuel return path returning fuel from a point in the fuel line downstream of the fuel pump to the fuel tank;
   wherein:
      said point is downstream of said at least one augmentor metering valve, and
      said at least one fuel line includes a selector valve at said point, said selector valve being shiftable from a first position directing fuel to said at least one augmentor zone and blocking substantially all fuel flow to said fuel return path and a second position directing fuel to said fuel return path and blocking substantially all fuel flow to said at least one augmentor zone.

10. A fuel system for a gas turbine engine having at least one augmentor zone comprising:
    a fuel pump drawing fuel from a fuel tank and pumping the fuel in a downstream direction;
    at least one fuel line connecting said fuel pump to said at least one augmentor zone;
    at least one augmentor metering valve in said at least one fuel line for metering fuel to said at least one augmentor zone; and
    a fuel return path returning fuel from a point in the fuel line downstream of the fuel pump to the fuel tank;
    wherein:
       said point is downstream of said at least one augmentor metering valve, and
       said at least one fuel line comprises first and second augmentor fuel lines, said at least one augmentor zone comprises first and second augmentor zones and said at least one augmentor metering valve comprises first and second augmentor metering valves, wherein said point is located in said first augmentor fuel line.

* * * * *

UNITED STATES PATENT AND TRADEMARK OFFICE
CERTIFICATE OF CORRECTION

PATENT NO. : 7,584,602 B2  Page 1 of 1
APPLICATION NO. : 11/406322
DATED : September 8, 2009
INVENTOR(S) : Steven A. Lewis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Fourteenth Day of September, 2010

David J. Kappos
*Director of the United States Patent and Trademark Office*